United States Patent
Ward

(10) Patent No.: US 7,600,717 B2
(45) Date of Patent: Oct. 13, 2009

(54) AIRCRAFT WINGS AND FUEL TANKS

(75) Inventor: Michael David Ward, Bristol (GB)

(73) Assignee: Airbus Operations Limited, Bristol (GB)

( * ) Notice: Subject to any disclaimer, the term of this patent is extended or adjusted under 35 U.S.C. 154(b) by 491 days.

(21) Appl. No.: 11/469,071

(22) Filed: Aug. 31, 2006

(65) Prior Publication Data

US 2009/0212162 A1 Aug. 27, 2009

(30) Foreign Application Priority Data

Sep. 12, 2005 (GB) ................................ 0518576.4

(51) Int. Cl.
*B64D 37/04* (2006.01)
(52) U.S. Cl. .................................... 244/135 R
(58) Field of Classification Search ............. 244/135 R, 244/135 B, 135 C
See application file for complete search history.

(56) References Cited

U.S. PATENT DOCUMENTS

| | | | | |
|---|---|---|---|---|
| 2,356,786 | A | * | 8/1944 | Harman et al. ............. 137/255 |
| 2,397,184 | A | * | 3/1946 | Klose ..................... 244/135 R |
| 2,623,721 | A | * | 12/1952 | Harrington ............... 244/135 R |
| 2,845,937 | A | * | 8/1958 | Ksieski ...................... 137/38 |
| 3,419,233 | A | * | 12/1968 | Wotton .................... 244/135 R |
| 3,627,239 | A | * | 12/1971 | Hull, Jr. .................. 244/135 R |
| 4,872,120 | A | * | 10/1989 | Orloff et al. ................. 702/52 |
| 5,138,559 | A | | 8/1992 | Kuehl et al. |

(Continued)

FOREIGN PATENT DOCUMENTS

DE 4222449 A1 * 1/1994
EP 1762487 A2 * 3/2007

OTHER PUBLICATIONS

A310 MRTT tank layout figure Air Force Techonology, Aug. 14, 2005, via the internet archive http://web/archive.org/web/20051127125458/www.airforce-technology.com/projects/mrtt/mrtt2.html.*
Fuel tank layouts as shown schematically in Figures 1A (Airbus A321) and Figure 1B (Boeing B777), 1995.

*Primary Examiner*—Michael R Mansen
*Assistant Examiner*—Joseph W Sanderson
(74) *Attorney, Agent, or Firm*—Lowe Hauptman Ham & Berner, LLP

(57) ABSTRACT

On failure, a burst rotor of a wing-mounted engine (13, 23) can penetrate fuel tank walls in the wing of a conventional aircraft. There exists a zone that is at risk of such damage. Thus, the layout of fuel tanks (3, 11C, 21C) in the wing of an aircraft in accordance with embodiments includes port and starboard inner fuel tanks (11C, 21C) that are positioned adjacent to a central fuel tank (3) in the central wing section, but outside of the at-risk zone. Each of the port and starboard inner fuel tanks (11C, 21C) is defined in part by a respective inner boundary member (5RP, 5RS) that when viewed in plan extends, at least in part, in a direction at an angle of less than 20° to the adjacent vertical plane (A-A) defining the at-risk zone. Thus the amount of fuel stored in fuel tanks (11C, 21C) in the wing assembly that cover a region outside of the at-risk zone and that do not extend into the at-risk zone may be increased.

28 Claims, 5 Drawing Sheets

U.S. PATENT DOCUMENTS

| | | | |
|---|---|---|---|
| 5,983,945 A * | 11/1999 | Salmon | 137/899.2 |
| 6,021,978 A * | 2/2000 | Goss | 244/129.2 |
| 6,343,465 B1 * | 2/2002 | Martinov | 60/204 |
| 6,736,354 B2 * | 5/2004 | Goto et al. | 244/135 C |
| 6,899,300 B2 * | 5/2005 | Haghayeghi | 244/135 C |
| 7,293,741 B2 * | 11/2007 | Carns et al. | 244/135 B |
| 7,337,795 B2 * | 3/2008 | Johnson et al. | 137/1 |
| 2008/0230654 A1 * | 9/2008 | Velicki et al. | 244/135 R |

* cited by examiner

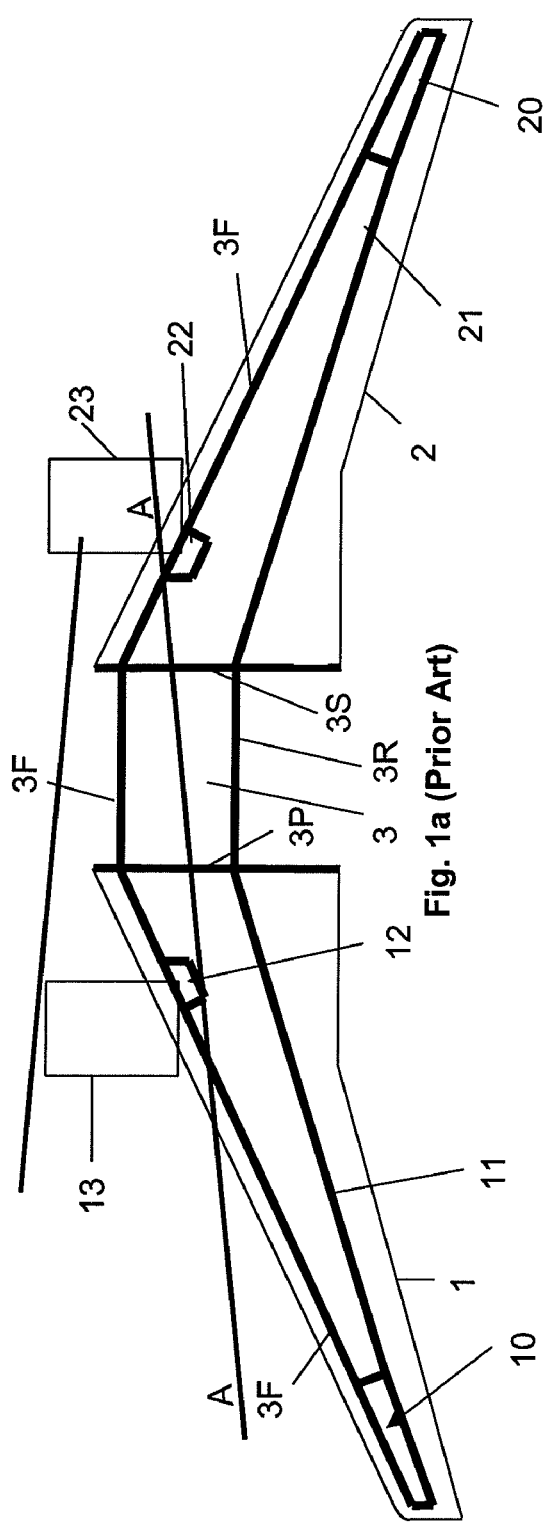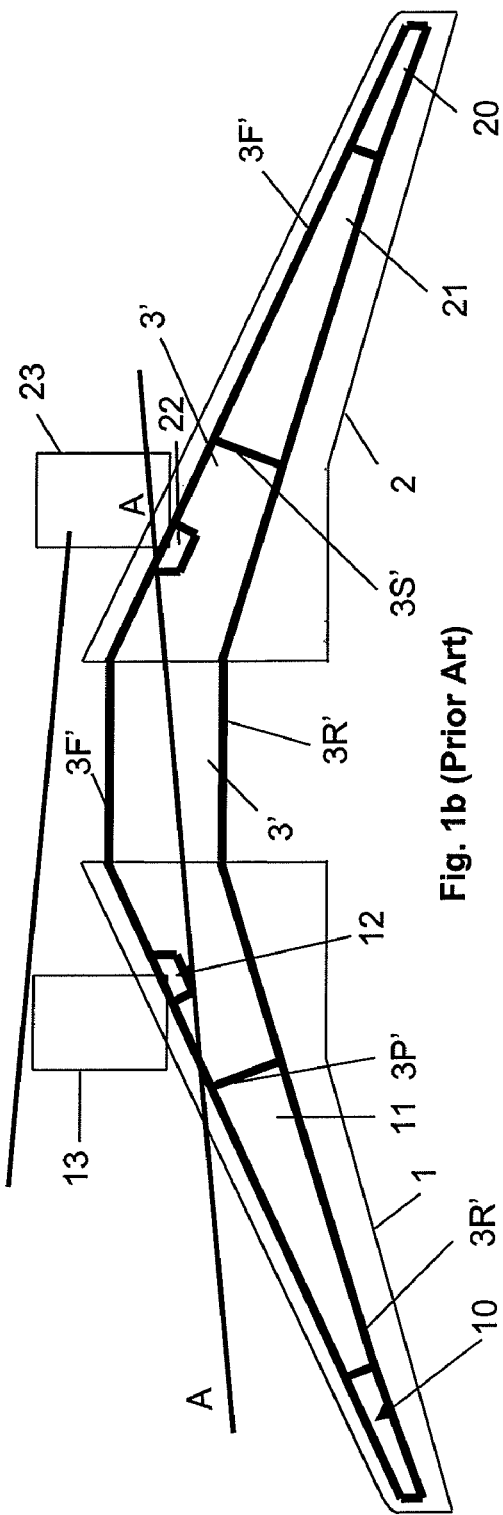
Fig. 1a (Prior Art)
Fig. 1b (Prior Art)

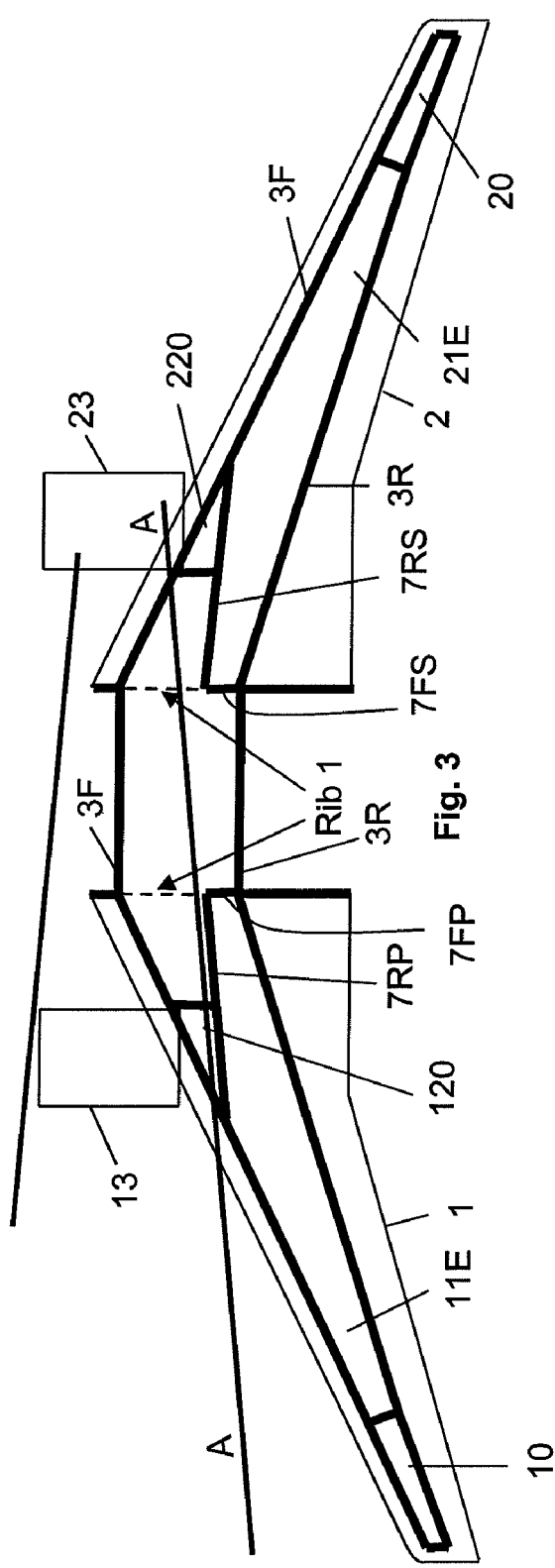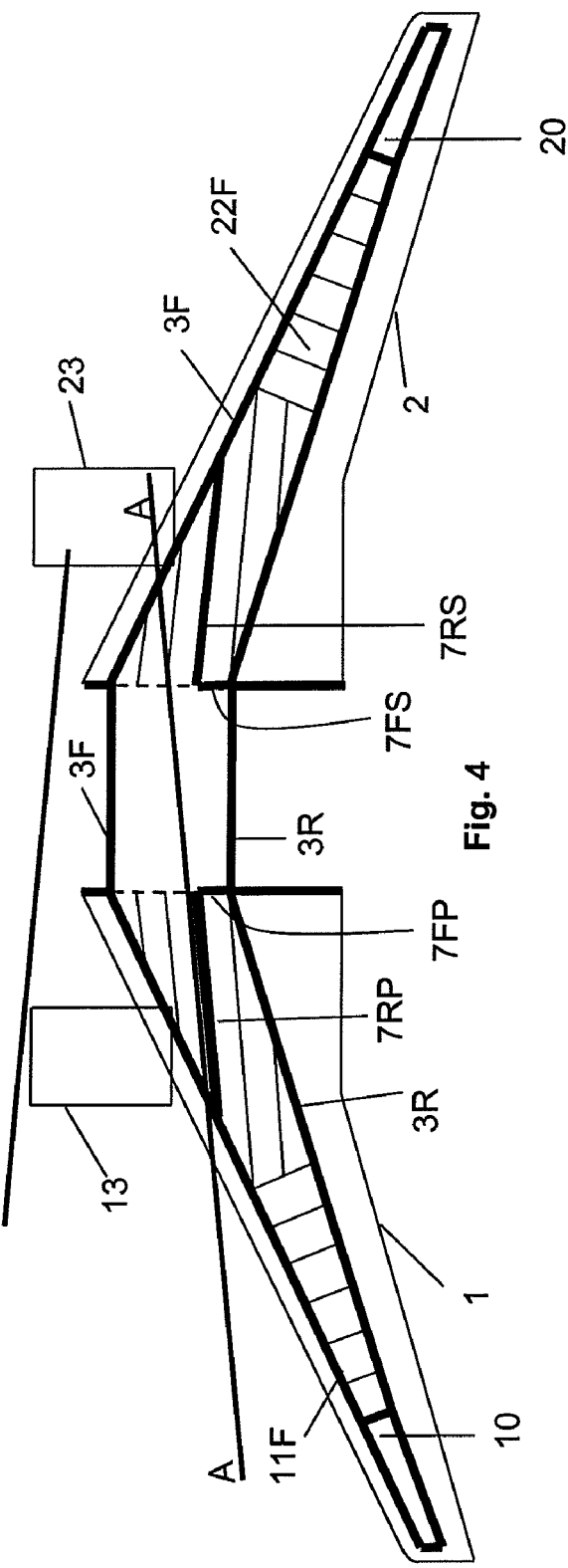

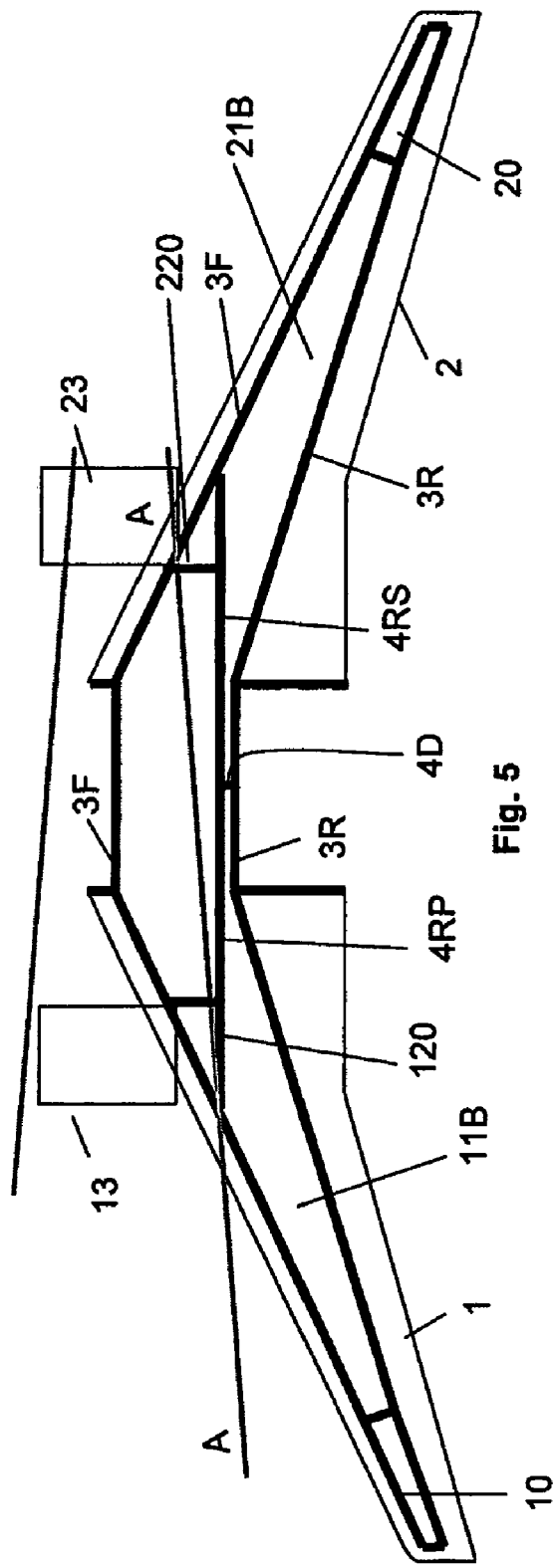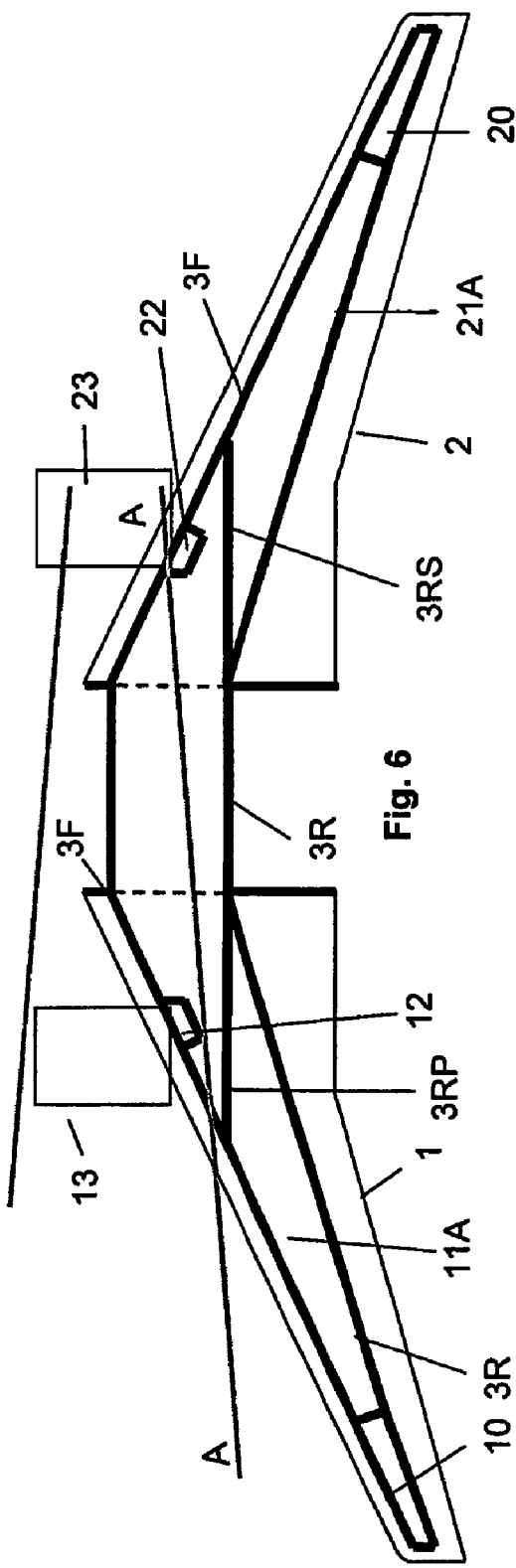

AIRCRAFT WINGS AND FUEL TANKS

RELATED APPLICATIONS

The present application is based on, and claims priority from, British Application Number 0518576.4, filed Sep. 12, 2005, the disclosure of which is hereby incorporated by reference herein in its entirety.

TECHNICAL FIELD

The invention relates to an aircraft wing assembly including a port wing and a starboard wing which, in use, carries port and starboard engines and serves to accommodate a plurality of fuel tanks.

BACKGROUND OF THE INVENTION

Internal combustion gas turbines used in aircraft engines are known, albeit with low probability, to fail and on failing, to shower a region in the vicinity of the failed engine with high-speed debris which has the potential to penetrate the structure, including the fuel tanks, of the aircraft. A result of such engine failure could be the rapid loss of fuel from a fuel tank or tanks, in which case the aircraft may be unable to reach its intended destination as a result of fuel loss.

SUMMARY OF THE INVENTION

According to a first aspect of the invention there is provided an aircraft wing assembly including a port wing which, in use, carries a port engine comprising at least one rotary disc, a starboard wing which, in use, carries a starboard engine comprising at least one rotary disc, a central wing element linking the port and starboard wings, and a plurality of tanks defined by a plurality of tank boundary members, the tank boundary members defining i) a central volume which covers at least a part of the central wing element and at least part of an at-risk zone, the at-risk zone consisting of the combination of a) a first region forwards of a vertical plane positioned such that when the starboard engine is fitted to the starboard wing the vertical plane extends from the centre of the rearmost rotary disc of the starboard engine backwards and towards the port wing and is separated from the plane of the starboard rotary disc by a dispersion angle, and b) a second region forwards of a vertical plane positioned such that when the port engine is fitted to the port wing the vertical plane extends from the centre of the rearmost rotary disc of the port engine backwards and towards the starboard wing and is separated from the plane of the port rotary disc by the dispersion angle, ii) a port inner fuel tank adjacent to the central volume, and iii) a starboard inner fuel tank adjacent to the central volume, wherein the dispersion angle is between 2° and 10°, and the port inner fuel tank and the starboard inner fuel tank are positioned outside of the at-risk zone and each are defined in part by a respective inner boundary member that when viewed in plan extends, at least in part, in a direction at an angle of less than 20° to the adjacent vertical plane defining the at-risk zone.

The tank boundary members are so arranged that the port inner fuel tank and the starboard inner fuel tank are positioned outside of the at-risk zone, despite those tanks being adjacent to the central volume. The invention thus advantageously provides an arrangement in which the loss of fuel from fuel tanks in the event of an engine failure that results in debris from the engine penetrating the aircraft structure is significantly reduced as compared to prior art arrangements in which large fuel tanks in the wings extend into the at-risk zone. It will be appreciated that the above-mentioned definition of the at-risk zone is intended to cover the volume of the aircraft structure that is subject to a non-negligible risk of being in the path of debris in the event of an engine failure, which results in debris being ejected, for example, from the rotary disc of the engine. Such a failure leads to the debris potentially departing from the engine at an angle which deviates from the plane of rotation of the rotary disc of the engine by an angle of dispersion. This angle of dispersion can be discovered by test, analysis or experience. The dispersion angle may therefore be different in respect of different aircraft designs. Thus, the dispersion angle may be 3° or greater. The dispersion angle may be less than 6°. When considering, during the design of the fuel tank layout of a typical aircraft, the effects of such a failure a dispersion angle in the range of 3 to 5 degrees may be used.

It will be understood that the term inner boundary member is intended to cover a boundary member, or part thereof, that is positioned between (a) the fuel tank defined in part by the inner boundary member and (b) the at-risk zone. Thus, an inner boundary member may in certain embodiments of the invention be so positioned as to be adjacent to the at-risk zone.

The inner boundary member of at least one of the port inner fuel tank and the starboard inner fuel tank when viewed in plan preferably extends, at least in part, in a direction at an angle of less than 10°, preferably less than 5° and more preferably less than 2°, to the adjacent vertical plane defining the at-risk zone.

The tank boundary member separating the port inner fuel tank (or the starboard inner fuel tank) from the central volume may be a shared boundary member.

It will be understood that the invention is of particular application to high-energy rotating engines such as turbine engines. For example, the engine may be a turboprop engine, a turbojet engine or a turbofan engine.

In a first arrangement, the port inner fuel tank includes a port first inner boundary member that lies along a plane parallel to, and preferably closely adjacent to, the vertical plane that defines the first region of the at-risk zone, and a port dividing boundary member extending between the rear of the central wing element and the port first inner boundary member. As the port inner fuel tank is outside of the at-risk zone, it will be understood that the port first inner boundary member is positioned behind the at-risk zone.

Alternatively or additionally, in the first arrangement, the starboard inner fuel tank includes a starboard first inner boundary member that lies along a plane parallel to, and preferably closely adjacent to, the vertical plane that defines the second region of the at-risk zone, and a starboard dividing boundary member extending between the rear of the central wing element and the starboard first inner boundary member.

Preferably, in the first arrangement, the port and starboard first inner boundary members lie aligned with the rear of the central wing element, forming a linear boundary element extending from the front of the port inner tank across the port wing, across the central wing element and across the starboard wing to the front of the starboard inner tank.

Alternatively, the port and starboard first inner boundary members may be spaced apart so that they do not meet. Particularly in such an alternative arrangement it is preferable for there to be a port dividing boundary member and/or a starboard dividing boundary member. The port dividing boundary member may extend between the rear of the central wing element and the port first inner boundary member. The port dividing boundary member preferably lies in the region of the port edge of the central wing element. The port dividing boundary member may, for example, lie along the first rib of the port wing. Similarly, in arrangements including a starboard dividing boundary member extending between the rear of the central wing element and the starboard first inner boundary member, the starboard dividing boundary member preferably lies in the region of the starboard edge of the central wing element and more preferably along the first rib of the starboard wing.

In a further arrangement, the port inner fuel tank includes a port second inner boundary member that lies in front of the rear of the central wing element and a port dividing boundary member extending between the rear of the central wing element and the port second inner boundary member.

Alternatively or additionally, in this further arrangement, the starboard inner fuel tank includes a starboard second inner boundary member that lies in front of the rear of the central wing element and a starboard dividing boundary member extending between the rear of the central wing element and the starboard second inner boundary member.

In this further arrangement, the port and starboard second inner boundary members may meet and form a linear boundary element in front of the rear of the central wing element, extending from the front of the port inner tank across the port wing, across the central wing element and across the starboard wing to the front of the starboard inner tank.

The inner boundary member of at least one of the port inner fuel tank and the starboard inner fuel tank when viewed in plan may extend, at least in part, in a direction at an angle of less than 10°, preferably less than 5° and more preferably less than 2°, to the direction of the rear boundary of the region of the wing in which the inner boundary member is located. For example, in a further alternative arrangement, the port inner fuel tank includes a port third inner boundary member that when viewed in plan extends in a direction at an angle of less than 2° to the direction of the rear boundary of the central wing element. The port third inner boundary member may run parallel to the rear of the central wing element. The port third boundary member may coincide with the rear of the central wing element or may be spaced apart therefrom. Thus, the port third boundary member may be in the form of an extension of the rear of the central wing element.

Alternatively or additionally, in this further alternative arrangement, the starboard inner fuel tank includes a starboard third inner boundary member that has one or more features of the afore-mentioned port third inner boundary member.

Preferably, in this further alternative arrangement, the port and starboard third inner boundary members meet and form a non-linear boundary element in front of the rear of the central wing element, extending from the front of the port inner tank across the port wing, across the central wing element and across the starboard wing to the front of the starboard inner tank.

In yet another alternative arrangement, the port inner fuel tank includes a non-linear port fourth inner boundary member that includes a first part, in the central wing element, lying forward of the rear of the central wing element, a second part which joins the first part and lies about parallel to and ahead of the rear of the port wing, a third part which joins the second part and runs forward across the port wing to the front of the port wing, and a port dividing boundary member extending between the rear of the central wing element and the first part of the port fourth inner boundary member.

Preferably, in the yet another alternative arrangement, the starboard inner fuel tank includes a non-linear starboard fourth inner boundary member that includes a first part, in the central wing element, lying forward of the rear of the central wing element, a second part which joins the first part and lies about parallel to and ahead of the rear of the starboard wing, a third part which joins the second part and runs forward across the starboard wing to the front of the starboard wing, and a starboard dividing boundary member extending between the rear of the central wing element and the first part of the starboard fourth inner boundary member.

Preferably, in the yet another alternative arrangement, the port and starboard fourth inner boundary members meet and form a non-linear boundary element, extending from the front of the port inner tank across the port wing, along the port wing, across the central wing element, along the starboard wing and across the starboard wing to the front of the starboard inner tank.

Preferably, in one or more of the arrangements, a shared dividing boundary member serves as the port and starboard dividing boundary members.

Preferably, there is at least one inner boundary member that extends up to the at-risk zone, but not into the at-risk zone. As such, there may be at least one inner boundary member that is closely adjacent to, but outside of the at-risk zone. Preferably there are at least two inner boundary members that are closely adjacent to, but outside of the at-risk zone. There may therefore be one or more fuel tanks that are wholly positioned outside of the at-risk zone, but which extend so that a portion of the fuel tank is next to, closely adjacent to, or even touching the boundary of the at-risk zone. There may be at least one inner boundary member that runs parallel to, and is closely adjacent to, a boundary of the at-risk zone. One or more of the inner boundary members mentioned herein may extend so as to follow the line of the at-risk zone either partially or completely. In one embodiment of the invention, all of the boundary members that define the tanks adjacent to and outside of the at-risk zone and that are adjacent to the at-risk zone follow the boundary of the at-risk zone. Such an arrangement may effectively maximise the volume of fuel able to be kept outside of the at-risk zone.

A plurality of the arrangements include port and starboard dry bays, which are when viewed in plan immediately behind the positions of the engines, wherein the port and starboard inner boundary members merge with the boundaries of the port and starboard dry bays.

The footprint of the central volume may when viewed from above extend beyond the footprint of the fuselage. Alternatively, the footprint of the central volume may extend closely adjacent to, but not beyond, the footprint of the fuselage.

In a plurality of arrangements, one or more central fuel tanks are provided within the central volume. The central volume may alternatively be in the form of a dry bay, for example.

Preferably, in arrangements including one or more central fuel tanks, the port and starboard inner boundary members serve as shared boundary members between the port and starboard inner tanks and the one or more central fuel tanks.

Preferably, the port and starboard wings of the aircraft wing assembly are swept wings. The wing assembly is preferably large enough to be suitable for use on an aircraft large enough to accommodate at least 100 passenger seats.

The aircraft wing assembly may be such that the sum area defined by the footprint when viewed in plan of all of the fuel tanks in the wing assembly that cover a region outside of the at-risk zone and that do not extend into the at-risk zone is greater than 75%, preferably greater than 80%, more preferably greater than 85%, yet more preferably greater than 90%, and even more preferably greater than 95%, of the area defined by the footprint when viewed in plan of the volume in the wing assembly available for fuel tanks and outside of the at-risk zone. The footprint of the fuel tank layout may be deemed as being the horizontal cross-section of the wing that yields the greatest cross-sectional area of fuel tanks. Any volume of the wing that is not used to store fuel may be considered as falling outside the definition of the volume in the wing assembly available for fuel tanks.

Alternatively, the sum area defined by the footprint when viewed in plan of all of the fuel tanks in the wing assembly that cover a region outside of the at-risk zone and that do not extend into the at-risk zone may be greater than 75% (and not necessarily greater than 90%), but is preferably greater than 80% and more preferably greater than 85%, of the area defined by the footprint when viewed in plan of the volume in the wing assembly available for fuel tanks and outside of the at-risk zone. It will, of course, be understood that maximising this sum area will maximise the volume available for storing fuel in fuel tanks that are positioned wholly outside the at-risk zone. As such, the fuel tank layout is advantageously so arranged that this sum area is greater than 95% of the area available for fuel tanks and outside the at-risk zone. In the case where tank boundary members follow the line of the at-risk zone as closely as possible the sum area defined by the footprint when viewed in plan of all of the fuel tanks in the wing assembly that cover a region outside of the at-risk zone and that do not extend into the at-risk zone may be almost equal to the area defined by the footprint when viewed in plan of the volume in the wing assembly available for fuel tanks and outside of the at-risk zone.

It will be appreciated that features of the first aspect of the invention may be incorporated into this second aspect and vice versa.

An aircraft port wing may be the port wing of an aircraft wing assembly in accordance with the invention and, alternatively or additionally, an aircraft starboard wing may be the starboard wing of an aircraft wing assembly in accordance with the invention.

An aircraft may include an aircraft wing assembly in accordance with the invention.

It will be appreciated that the use herein of identifiers such as first, second, third, and so on in relation to the boundary members of the fuel tanks are used solely for the sake of readily distinguishing between optional features of the invention. Thus, there may be provided an arrangement including boundary members in accordance with the third boundary members mentioned herein without necessarily including boundary members in accordance the first or second boundary members. Also features described in relation to one of the first, second, third or fourth boundary members may where appropriate be incorporated into another of the boundary members.

BRIEF DESCRIPTION OF THE DRAWINGS

Two known aircraft wing assemblies of the prior art and a plurality of aircraft wing assemblies in accordance with various embodiments of the invention will now be described, by way of example only, with reference to the accompanying drawings, in which:

FIGS. 1a and 1b are representations, in plan, of conventional configurations of fuel tanks in an aircraft wing assembly, FIG. 3 is a representation, in plan, of a second arrangement of fuel tanks in an aircraft wing assembly, in accordance with the invention, FIG. 4 is a representation, in plan, of a third arrangement of fuel tanks in an aircraft wing assembly, in accordance with the invention, FIG. 5 is a representation, in plan, of a fourth arrangement of fuel tanks in an aircraft wing assembly, in accordance with the invention, FIG. 6 is a representation, in plan, of a fifth arrangement of fuel tanks in an aircraft wing assembly, in accordance with the invention.

DETAILED DESCRIPTION OF EMBODIMENTS

Figure 2:
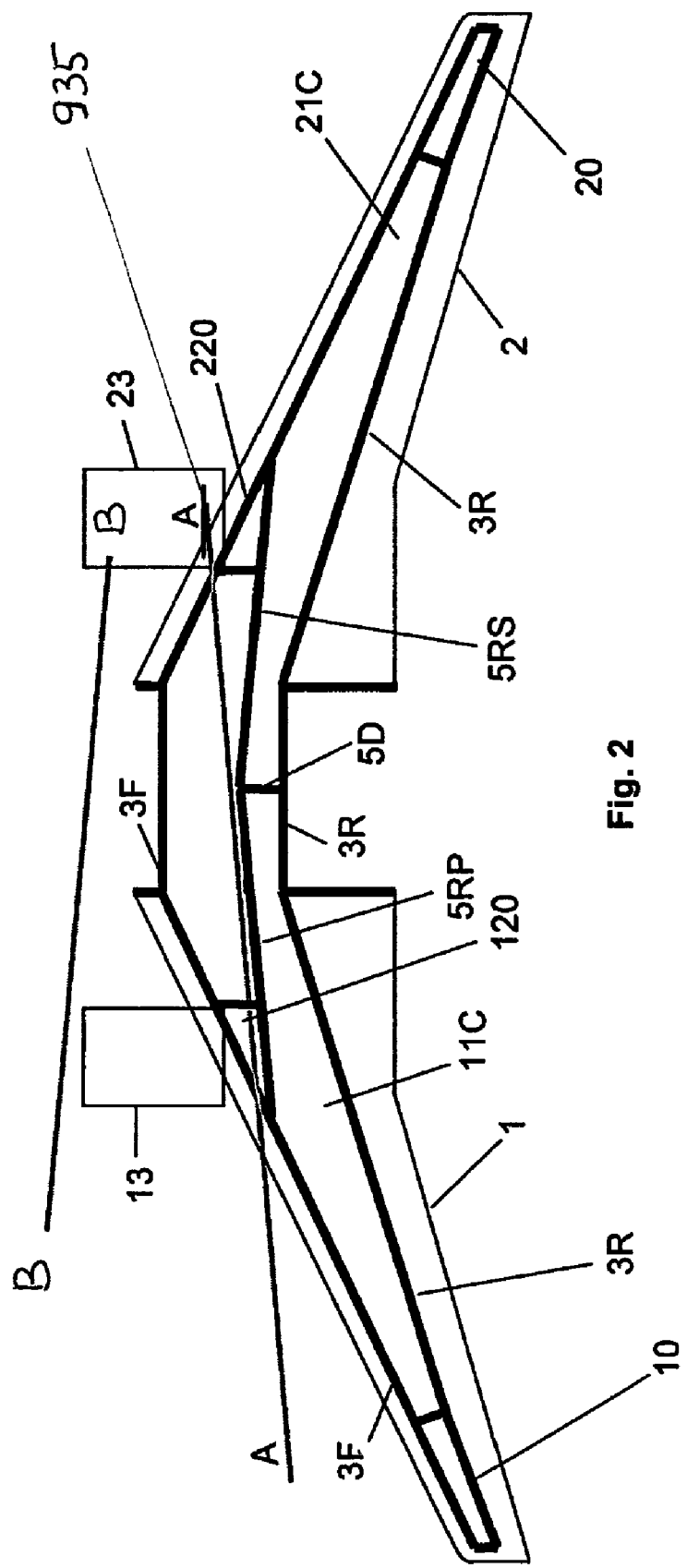
FIG. 2 is a representation, in plan, of a first arrangement of fuel tanks in an aircraft wing assembly, in accordance with the invention.

In the following description and in the accompanying drawings various reference numerals include the letters F, R, P, S & T; these letters are used generally to denote, respectively, front, rear, port, starboard and transverse.

FIG. 1a shows a first configuration for fuel tanks in an aircraft wing assembly of the prior art. The assembly includes a central wing element, a port wing 1 and a starboard wing 2. Accommodated in the wing are various tanks including a central fuel tank 3, a port vent tank 10, a port inner tank 11, a starboard vent tank 20 and a starboard inner tank 21. The position occupied by a port engine is indicated as 13 and the position occupied by a starboard engine is indicated as 23. A port dry bay 12 occupies a position adjacent to the position 13 of the port engine and a starboard dry bay 22 occupies a position adjacent to the position 23 of the starboard engine.

The central fuel tank 3 is defined by a front boundary member 3F extending to the front of the central wing element, a rear boundary member 3R extending to the rear of the central wing element, a port boundary member 3P and a starboard boundary member 3S. The port boundary member 3P is a boundary member shared with the port inner fuel tank 11 and the starboard boundary member 3S is a boundary member shared with the starboard inner fuel tank 21. The front and rear of the port and starboard inner fuel tanks 11, 21 are also defined by the front boundary member 3F and the rear boundary member 3R, respectively. Tanks 3, 11 and 21 are also covered by a skin, which allows them to contain fuel.

A line AA represents a plane at the rear of a first region of an at-risk zone, where the first region extends forwards of a vertical plane positioned such that, when the starboard engine 23 is fitted to the starboard wing 2, the vertical plane extends from the centre of the rearmost rotary disc 935 (FIG. 2) of the starboard engine 23 backwards and towards the port wing 1 and is separated from the plane of the starboard rotary blade ring by a predefined dispersion angle, which in this case is 5°.

There exists a second region of the at-risk zone, where the second region extends forwards of a vertical plane positioned such that, when the port engine 13 is fitted to the port wing 1, the vertical plane extends from the centre of the rearmost rotary disc of the port engine 13 backwards and towards the starboard wing 2 and is separated from the plane of the port rotary disc by the predefined dispersion angle of 5°.

The at-risk zone is likely to be traversed by debris from a starboard engine burst, in the event of a starboard engine burst or a port engine burst, in the event of a port engine burst. For example, as shown in FIG. 2, in the event of a starboard engine burst, debris travels in the zone defined between two oblique lines AA and BB. As is evident from the line AA in relation to the boundary members of the fuel tanks 11, 21 and 3, debris travelling along the line AA from a starboard engine burst may damage the boundary members and skin of the centre, port inner and starboard inner tanks 3, 11 and 21 and, also, the shared boundary members 3P and 3S between the centre tank 3 and the adjacent port inner and starboard inner tanks 11 and 21. A possible result is some loss of fuel from all fuel tanks, apart from the vent tanks 10 and 20, which in use are not normally used to carry fuel. Thus, there are no fuel tanks in the wing assembly that cover a region outside of the at-risk zone and that do not extend into the at-risk zone.

FIG. 1b shows a second configuration for fuel tanks in an aircraft wing assembly of the prior art. The reference numerals used in FIG. 1b correspond to those used in FIG. 1a to refer the same or similar parts. Thus, the assembly shown in FIG. 1b includes a port wing 1, a starboard wing 2, a central fuel tank 3', a port vent tank 10, a port inner tank 11, a starboard vent tank 20 and a starboard inner tank 21. The main difference of the layout of FIG. 1b as compared with FIG. 1a is that the central fuel tank 3' happens to be very large. Thus, the front of the central fuel tank 3' is defined by a front boundary member 3F' extending from the front of the central wing element on the port side to beyond the port dry bay 12 and on the starboard side to beyond the starboard dry bay 22. Similarly, the rear boundary member 3R' follows the rear boundary of the wing, from a position approximately opposite the port engine position 13 via the rear boundary of the central wing element to rear boundary of the wing up to a position approximately opposite the starboard engine position 23. The port boundary member 3P' follows the line of a rib positioned at a spanwise position at about a third of the way from the root of the wing to the tip. The starboard boundary member 3S' is positioned along the line of the corresponding rib in the starboard wing. Thus, the port inner fuel tank 11 defined in part by the port boundary member 3P' and the starboard inner fuel tank 21 defined in part by the starboard boundary member 3S' are both much smaller than the corresponding tanks in FIG. 1a. Both inner fuel tanks 11, 21 are fortuitously positioned outside of the at-risk zone and are therefore unlikely to be at risk of damage in the event of a rotor disc bursting. Undesirably, however, the volume of fuel lost in the event of a rotor burst is high as a result of the large volume of the central fuel tank 3'. As can be seen from FIG. 1b, the footprint of the inner fuel tanks 11, 21 accounts for only about half of the footprint of the available volume for fuel storage that is outside of the at-risk zone.

Referring to FIG. 2, a first arrangement of fuel tanks in accordance with the invention is shown that provides significant improvements over both the FIG. 1a and FIG. 1b configurations of the prior art. The first arrangement includes a central fuel tank 3 having a volume that extends just beyond the at-risk zone. The fuel tank is delimited by means of a front boundary member 3F extending along the front of the wing including the central wing element, a rear port first inner boundary member 5RP lying along a plane parallel to and directly behind and adjacent to the vertical plane (the plane represented by the line AA) that defines the first region of the at-risk zone and a rear starboard first inner boundary member 5RS lying along a plane parallel to and directly behind and adjacent to the vertical plane that defines the second region of the at-risk zone. Thus, in the first arrangement, the port and starboard first inner boundary members 5RP and 5RS meet and form a non-linear boundary member in front of the centre of the rear boundary 3R of the central wing element. This non-linear boundary member extends from the front of the wing, to define the front wall of a port inner tank 11C, across the port wing 1, across the central wing element and across the starboard wing 2 to the front of the wing, thereby also defining the front wall of a starboard inner tank 21C. A dividing boundary member 5D extends between the rear of the central wing element and this non-linear boundary member. The dividing boundary member 5D serves as a shared boundary member between the port and starboard inner tanks 11C and 21C, which both extend into the central wing element of the aircraft wing assembly. The remaining walls of the port and starboard inner tanks 11C and 21C are defined by front boundary members 3F and rear boundary members 3R, which each broadly follow, and are near to, the line of the front and rear of the wing, respectively. It will be seen that the non-linear boundary member extends to these remaining front boundary members 3F of the port and starboard inner fuel tanks 11C and 21C such that the non-linear boundary member meets the front boundary member 3F of the port inner fuel tank 11C at a position lying beyond the port limit of the port engine position 13 and meets the front boundary member of the starboard inner fuel tank 21C at a position lying beyond the starboard limit of the starboard engine position 23. The port first inner boundary member 5RP also serves as a boundary member of the port dry bay 120 and the starboard first inner boundary member 5RS serves as a boundary member of the starboard dry bay 220.

As is evident from the position of the port first inner boundary member 5RP of the non-linear rear boundary member in relation to the plane represented by the line AA, the port first inner boundary member 5RP is unlikely to be damaged from debris from a starboard engine disc burst travelling within the at-risk zone defined by the region forwards of the plane represented by the line AA, resulting in the safe retention of fuel stored in the port inner tank 11C. A corresponding situation exists in respect of the starboard first inner boundary member 5RS and the starboard inner fuel tank 21C in relation to the position 13 of a port engine.

In the arrangement represented by FIG. 2, the sum area defined by the footprint when viewed in plan of all of the fuel tanks 11C and 21C in the wing assembly that cover a region outside of an at-risk zone and that do not extend into the at-risk zone is almost equal to, and is certainly greater than 95% of, the area defined by the footprint when viewed in plan of the volume in the wing assembly available for fuel tanks and outside of the at-risk zone. It will of course be appreciated that the dry bays 120, 220, the vent tanks 10, 20 and the regions forward of the front boundary member 3F and rearwards of the rear boundary member 3R are all considered as being unavailable for usage as fuel tanks.

FIG. 3 shows a modification of the arrangement of FIG. 2. In a manner similar to the arrangement of FIG. 2, the inner boundary members defining the fuel tank layout include a port first inner boundary member 7RP, which lies just behind the vertical plane (represented by the line AA) that defines the first region of the at-risk zone, and a starboard first inner boundary member 7RS which lies along a plane parallel to and just behind the vertical plane that defines the second region of the at-risk zone. In contrast to the arrangement of FIG. 2, the port and starboard first inner boundary members 7RP, 7RS do not meet, but instead each extend to a respective fore-to-aft boundary member. Thus, the port first inner boundary member 7RP meets a fore-to-aft port boundary member 7FP, which lies at the port edge of the central wing element and extends from the port first inner boundary member 7RP to the rear of the central wing element. Similarly, a starboard fore-to-aft boundary member 7FS lies at the starboard edge of the central wing element, extending between the rear of the central wing element and the starboard first inner boundary member 7RS. Both fore-to-aft boundary members 7FP, 7FS are defined by a rib (rib number 1) in each wing. As such, and in contrast to the arrangement of FIG. 2, this arrangement aids join-up of the wing and fuselage during assembly of the aircraft.

As is shown in FIG. 3, the boundary members 7RP and 7RS extend to front boundary members of the fuel tanks 11E and 21E, lying at or near the front of the wings 1 and 2. The port first inner boundary member 7RP meets the front boundary member of the port inner fuel tank 11E at a position lying beyond the port limit of the port engine position 13. The starboard first inner boundary member 7RS meets the front boundary member of the starboard inner fuel tank 21E at a position lying beyond the starboard limit of the starboard engine position 23. A part of the port first inner boundary member 7RP adjacent to the front boundary of the port inner fuel tank serves as a boundary member of the port dry bay 120 and a corresponding part of the starboard first inner boundary member 7RS serves as a boundary member of the starboard dry bay 220.

Similarly to FIG. 2, both port and starboard inner fuel tanks 11E, 21E of the FIG. 3 arrangement are outside of the at-risk zone. In contrast to the arrangement of FIG. 2, the central fuel tank 3 extends slightly further beyond the at-risk zone, in that the rear wall of the central fuel tank 3 is defined by the rearmost boundary member 3R of the central wing element. However, the sum area defined by the footprint when viewed in plan of all of the fuel tanks 11E and 21E in the wing assembly that cover a region outside of the at-risk zone and that do not extend into the at-risk zone is still greater than 90% (actually about 91%) of the area defined by the footprint when viewed in plan of the volume in the wing assembly available for fuel tanks and outside of the at-risk zone. Such a high percentage is possible by means of incorporating the first inner boundary members 7RP, 7RS that are parallel and close to the adjacent region of the at-risk zone.

FIG. 4 shows a third arrangement of a wing structure, in which the layout of the fuel tanks is identical to that of the second arrangement shown in FIG. 3 except that the load bearing structural members in the wing is different. Thus, the third arrangement is the same as the second arrangement except that, in the case of the third arrangement, the first inner boundary members 7RP and 7RS are structural members of the wing assembly. In the arrangement represented by FIG. 3, ribs and spars of the wing structure are positioned conventionally. The wing arrangement represented by FIG. 4 differs in that respect in that the structural members incorporated extend in directions different from those typical of ribs and spars in conventional wing design. The aircraft wing assembly of the third arrangement is conveniently implemented using a composite construction. The use of composite components, in particular, in the wing structure can assist, when creating a wing design, in allowing a greater variety of internal structural members that can be used as fuel tank boundaries than a conventional wing assembly, as a result for example of greater design freedom, lending greater flexibility to fuel tank boundary arrangements.

Referring to FIG. 5, a fourth arrangement of fuel tanks in accordance with the invention is shown, the fourth arrangement being a modification of the first arrangement shown in FIG. 2. The port and starboard first inner boundary members 5RP and 5RS of the first arrangement, which extend parallel to the adjacent region of the at-risk zone, are replaced by port and starboard second inner boundary members 4RP and 4RS, which extend parallel to and spaced-apart from the rear boundary member 3R of the central wing section. Thus, each of the port and starboard second inner boundary members 4RP and 4RS extend at an angle of 5° to the adjacent vertical plane defining the at-risk zone. Similarly to the FIG. 2 arrangement, a dividing boundary member 4D extends between the rear boundary member 3R and the junction at which the port second inner boundary member 4RP and the starboard second inner boundary member 4RS meet. In this arrangement however it will be appreciated that together the port second inner boundary member 4RP and the starboard second inner boundary member 4RS define a single linear inner boundary member in the form of a spar that passes across the fuselage. This linear inner boundary member runs parallel to the rear boundary of the central wing section and is thus also perpendicular to the fuselage in the assembled aircraft. Such a layout aids structural fabrication.

The port and starboard dry bays 120, 220 are, similarly to the FIG. 2 arrangement, defined in part by the port and starboard second inner boundary members 4RP and 4RS, respectively, which each form a rear wall of one of the dry bays.

As is evident from the position of the port second inner boundary member 4RP in relation to the plane represented by the line AA, the port second inner boundary member 4RP is very likely to escape damage from debris from a starboard engine burst travelling along and forwards of the plane represented by the line AA, resulting in the retention of fuel stored in the port inner tank 11B. A corresponding situation exists in respect of the starboard boundary member 4RS and the starboard inner tank 21B in relation to the position 13 of a port engine. Thus, both inner wing tanks 11B and 21B are positioned wholly outside of the at-risk zone.

In the arrangement represented by FIG. 5, the sum area defined by the footprint when viewed in plan of all of the fuel tanks 11B and 21B in the wing assembly that cover a region outside of the at-risk zone and that do not extend into the at-risk zone is about 90% of the area defined by the footprint when viewed in plan of the volume in the wing assembly available for fuel tanks and outside of the at-risk zone.

Referring to FIG. 6, a fifth arrangement of fuel tanks in accordance with the invention is shown. This fifth arrangement is a variation of the fourth arrangement and differs in that the port and starboard second inner boundary members 4RP and 4RS, which extend parallel to and are spaced-apart from the rear boundary member 3R of the central wing section, are replaced by a port third inner boundary member 3RP and a starboard third inner boundary member 3RS, both of which being in line with the rear boundary member 3R of the central wing section. Thus, each of the port and starboard third inner boundary members 3RP and 3RS extend at an angle of 5° to the adjacent vertical plane defining the at-risk zone. As is shown in FIG. 6, the port and starboard third inner boundary members 3RP and 3RS lie aligned with the rear of the central wing element, forming a linear boundary element extending from the front of the port inner tank 11A across the port wing 1, across the central wing element and across the starboard wing 2 to the front of the starboard inner tank 21A. In this arrangement however, because the rear boundary of the central wing section is used to define the central fuel tank, the central spar extending through the fuselage as illustrated in the FIG. 5 embodiment is omitted.

In contrast to the arrangement of FIG. 5, the port and starboard dry bays 12, 22 do not share a boundary with the inner boundary members 3RP and 3RS that define in part the walls of the port and starboard fuel tanks, respectively. Instead, the port and starboard dry bays 12, 22 are defined by the front wing boundary and internal boundary members that define the central fuel tank, in a manner similar to the configurations of the prior art of FIGS. 1a and 1b.

As will be evident from the position of the boundary member 3RP in relation to the plane represented by the line AA, the boundary member 3RP is very likely to escape damage from debris from a starboard engine burst travelling along and forwards of the plane represented by the line AA, resulting in the retention of fuel stored in the port inner tank 11A. A corresponding situation exists in respect of the starboard boundary member 3RS and the starboard inner tank 21A in relation to the position of a port engine In the arrangement represented by FIG. 6, the sum area defined by the footprint when viewed in plan of all of the fuel tanks 11A and 21A, in the wing assembly, that cover the region outside of the at-risk zone and do not extend into the at-risk zone is (at about 77%) just greater than 75% of the area defined by the footprint when viewed in plan of the volume in the wing assembly available for fuel tanks and outside of the at-risk zone. Whilst the volume available for storage of fuel in fuel tanks that do not extend into the at-risk zone has not been maximised, the internal structure necessary to define the fuel tank layout is relatively simple in that the structure is to a first approximation equivalent simply to extending the rear boundary member 3R of the central wing section. Using a structural member that extends near to the at-risk zone and roughly in the same direction (in this case at an angle of about 5° to the adjacent vertical plane defining the at-risk zone) to define the inner wing fuel tanks, as opposed to using one or more ribs of the wing structure, makes a large difference to the volume of fuel stored in fuel tanks that do not extend into the at-risk zone, because the wing is thicker nearer the root. Thus, whilst the difference in percentage usage of available safe area for use as fuel tanks as compared between this embodiment (77%) and the layout of FIG. 1b (50%) may not immediately appear to be great, the extra amount of fuel storable in the inner wing fuel tanks 11A and 21A of the embodiment illustrated by FIG. 6 is much greater than the volume storable in the inner wing fuel tanks 11A and 21A of the prior art configuration illustrated by FIG. 1b.

Figure 7:
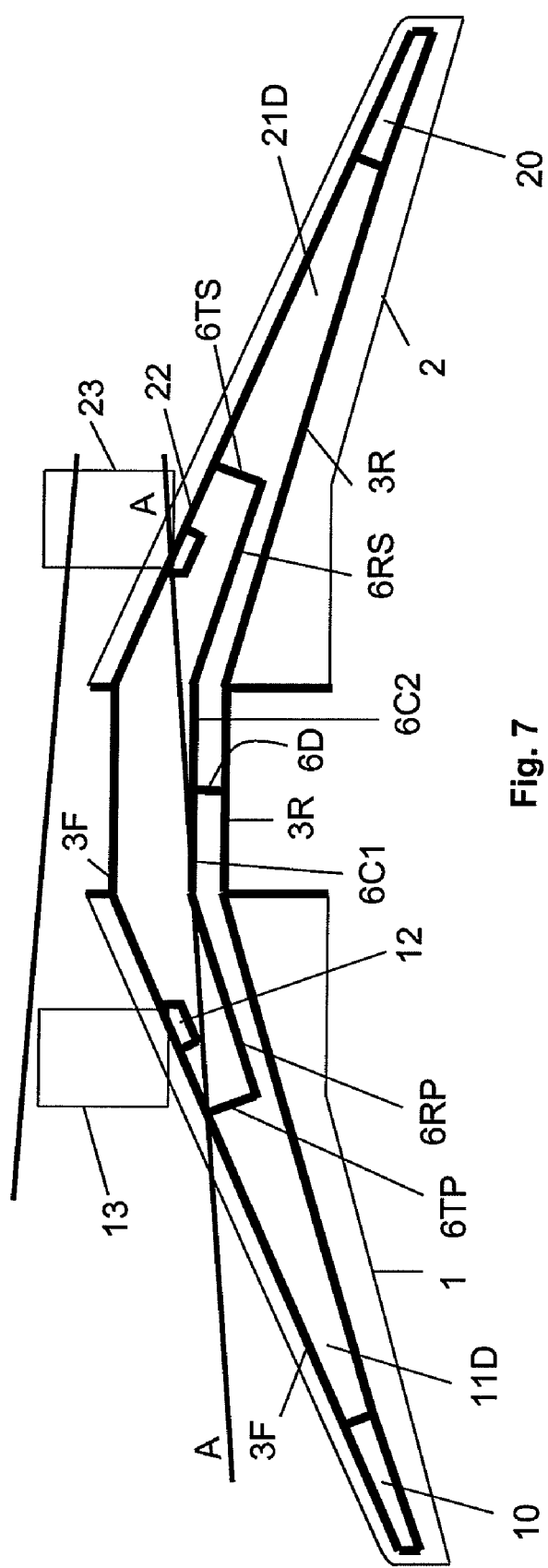
FIG. 7 is a representation, in plan, of a sixth arrangement of fuel tanks in an aircraft wing assembly, in accordance with the invention.

FIG. 7 illustrates a sixth arrangement of fuel tanks in accordance with the invention. This arrangement is a modification of the prior art configuration of FIG. 1b incorporating changes that provide advantages of the invention. The port inner fuel tank 11D of the sixth arrangement includes a non-linear port fourth inner boundary member that includes a first part 6C1, in the central wing element, lying forward of and parallel to the rear of the central wing element, a second part 6RP which joins the first part 6C1 and lies about parallel to and ahead of the rear boundary member of the port wing 1, a third part 6TP (comparable to the rib forming the boundary 3P' in the prior art configuration of FIG. 1b) which joins the second part 6RP and runs forward across the port wing 1 to the front of the port wing 1, and a dividing boundary member 6D extending between the rear of the central wing element and the first part 6C1 of the port fourth inner boundary member. Similarly, the starboard inner fuel tank 21D includes a non-linear starboard fourth inner boundary member that includes a first part 6C2, in the central wing element, lying forwards of the rear of the central wing element, a second part 6RS which joins the first part 6C2 and lies about parallel to and ahead of the rearmost boundary member of the starboard wing 2, and a third part 6TS which joins the second part 6RS and runs forwards across the starboard wing 2 to the front of the starboard wing 2. The first part 6C1 of the non-linear port fourth inner boundary member meets the first part 6C2 of the non-linear starboard fourth inner boundary member at the junction between the first part 6C1 of the non-linear port fourth inner boundary member and the dividing boundary member 6D. Thus, the dividing boundary member 6D also extends between the rear of the central wing element and the first part 6C2 of the starboard fourth inner boundary member. The first parts 6C1 and 6C2 of the non-linear port and starboard fourth inner boundary members together form a linear boundary member that runs parallel to but spaced apart from the rear boundary member 3R of the central wing section, and thus extend at an angle of about 5 degrees to the adjacent region of the at-risk zone. The second parts 6RS and 6RP of the non-linear port and starboard fourth inner boundary members, each being parallel with the rear boundary members of the port and starboard wing sections, respectively, extend at an angle of about 15 degrees to the adjacent region of the at-risk zone and follow the line of the rear spars (not shown in FIG. 1b) that are present in the wings of the prior art configuration shown in FIG. 1b.

The arrangement of FIG. 7, in comparison to the layout of FIG. 1b, thus effectively enlarges the inner fuel tanks 11D, 21D so that they extend into the central wing section and the central fuel tank 3 is correspondingly smaller. The structural alterations necessary to convert the configuration of FIG. 1b to that of FIG. 7 are reasonably straightforward to effect, as a result of using conventionally positioned ribs and spars to delimit the fuel tanks.

As is evident from the positions of the parts 6TP, 6RP and 6C1 of the port fourth inner boundary member in relation to the line AA, the parts 6TP, 6RP and 6C1 are very likely to escape damage from debris from a starboard engine burst travelling along and forwards of the plane represented by the line AA, resulting in the retention of fuel stored in the port inner tank 11D. The parts 6RP and 6C1 of the non-linear boundary member are positioned to meet at a position just behind the plane represented by the line AA. The parts 6C2, 6RS, and 6TS of the starboard fourth inner boundary member occupy positions in relation to the port engine 13 corresponding to those occupied by the parts 6C1, 6RP and 6TP of the port fourth inner boundary members in relation to the position 23 of a starboard engine. Thus, a corresponding situation exists in respect of the starboard fourth inner boundary member and the starboard inner fuel tank 21D in relation to the position 13 of a port engine.

As is shown in FIG. 7, the part 6TP of the port fourth inner boundary member meets the front boundary member of the port inner fuel tank 11D at a position lying beyond the port limit of the port engine position 13 and lying just behind the plane represented by the line AA, and the part 6TS of the starboard fourth inner boundary member meets the front boundary member of the starboard inner fuel tank 21D at a symmetrical position (lying beyond the starboard limit of the starboard engine position 23).

In the arrangement represented by FIG. 7, the sum area defined by the footprint when viewed in plan of all of the fuel tanks 11D and 21D in the wing assembly that cover a region outside of an at-risk zone and that do not extend into the at-risk zone is greater than 80% (being about 82%) of the area defined by the footprint when viewed in plan of the volume in the wing assembly available for fuel tanks and outside of the at-risk zone.

In the arrangements represented by FIGS. 2 to 7, the aircraft wing assembly may include a fuel tank or a plurality of fuel tanks within the central volume bounded by the port and starboard inner fuel tanks. Also, in general, the port and starboard inner boundary members serve as shared boundary members between the port and starboard inner tanks and the one or more fuel tanks within the central volume.

The arrangements of any of FIGS. 2 to 7 may be manufactured by means of a method of manufacturing an aircraft wing assembly in accordance with a further embodiment of the invention. Such a method includes an initial step of designing the aircraft fuel tank layout. The "at-risk zone" is defined by means of setting a dispersion angle (for example of 5 degrees as shown in the Figures), although of course other shapes of the at-risk zone may be set, if there might be different regions of fuel tanks at risk of damage in the event of engine failure. In consideration of the shape and size of the at-risk zone so defined the shape and number of the fuel tanks are defined by setting the locations of the fuel tank boundaries. The boundaries may be set so as to position the port inner fuel tank and the starboard inner fuel tank wholly outside of, but aligned with and/or close to, the at-risk zone. For example, a linear boundary may be set so as to define an inner fuel tank outside but adjacent to the at risk zone, the boundary being so positioned that when viewed in plan it is inclined to the at-risk zone by an angle no greater than 20°. Alternatively, or additionally, the boundaries may be set so that the sum area defined by the footprint when viewed in plan of all of the fuel tanks in the wing assembly that cover a region outside of the at-risk zone and that do not extend into the at-risk zone is greater than a given percentage (for example at least 75% and more preferably at least 90%) of the area defined by the footprint when viewed in plan of the volume in the wing assembly available for fuel tanks and outside of the at-risk zone. The boundaries may for example be set so as to effectively maximise the volume of fuel able to be kept in tanks that are wholly outside of the at-risk zone. After the positions of the boundaries of the fuel tanks have been set, the rest of the wing assembly may be designed in accordance with techniques known and standard in the art. The wing assembly may then be built and assembled according to the design so established in accordance with known and standard manufacturing techniques.

Whilst the present invention has been described and illustrated with reference to particular embodiments, it will be appreciated by those of ordinary skill in the art that the invention lends itself to many different variations not specifically illustrated herein. Thus, fuel tank boundaries different from those illustrated in the Figures may still be within the scope of the present invention. Embodiments of the present invention may of course improve protection/reduce vulnerability from events caused by failure of other rotating parts of the engine/turbine. Where in the foregoing description, integers or elements are mentioned which have known, obvious or foreseeable equivalents, then such equivalents are herein incorporated as if individually set forth. Reference should be made to the claims for determining the true scope of the present invention, which should be construed so as to encompass any such equivalents. It will also be appreciated by the reader that integers or features of the invention that are described as preferable, advantageous, convenient or the like are optional and do not limit the scope of the independent claims.

The invention claimed is:

1. An aircraft wing assembly including a port wing which, in use, carries a port engine comprising at least one rotary disc, a starboard wing which, in use, carries a starboard engine comprising at least one rotary disc, a central wing element linking the port and starboard wings, and a plurality of tanks defined by a plurality of tank boundary members, the tank boundary members defining
   i) a central volume which covers at least a part of the central wing element and at least part of an at-risk zone, the at-risk zone consisting of the combination of
      a) a first region forwards of a first vertical plane positioned such that when the starboard engine is fitted to the starboard wing the first vertical plane extends from the centre of the rearmost rotary disc of the starboard engine backwards and towards the port wing and is separated from the plane of the starboard rotary disc by a dispersion angle, and
      b) a second region forwards of a second vertical plane positioned such that when the port engine is fitted to the port wing the second vertical plane extends from the centre of the rearmost rotary disc of the port engine backwards and towards the starboard wing and is separated from the plane of the port rotary disc by the dispersion angle,
   ii) a port inner fuel tank adjacent to the central volume, and
   iii) a starboard inner fuel tank adjacent to the central volume,
   wherein
   the dispersion angle is between 2° and 10°, and
   the port inner fuel tank and the starboard inner fuel tank are positioned outside of the at-risk zone and each are defined in part by a respective inner boundary member that when viewed in plan extends, at least in part, in a direction at an angle of less than 20° to the adjacent vertical plane defining the at-risk zone.

2. An aircraft wing assembly as claimed in claim 1, wherein the inner boundary member of at least one of the port inner fuel tank and the starboard inner fuel tank when viewed in plan extends, at least in part, in a direction at an angle of less than 2° to the adjacent vertical plane defining the at-risk zone.

3. An aircraft wing assembly as claimed in claim 1, wherein the starboard inner fuel tank includes a starboard first inner boundary member that lies along a plane parallel and closely adjacent to the vertical plane that defines the second region of the at-risk zone.

4. An aircraft wing assembly as claimed in claim 3, wherein the port inner fuel tank includes a port first inner boundary member that lies along a plane parallel and closely adjacent to the vertical plane that defines the first region of the at-risk zone.

5. An aircraft wing assembly as claimed in claim 4, wherein the port inner fuel tank includes a port dividing boundary member extending between the rear of the central wing element and the port first inner boundary member.

6. An aircraft wing assembly as claimed in claim 5, wherein the port dividing boundary member lies at the port edge of the central wing element.

7. An aircraft wing assembly as claimed in claim 5, wherein the starboard inner fuel tank includes a starboard dividing boundary member extending between the rear of the central wing element and the starboard first inner boundary member.

8. An aircraft wing assembly as claimed in claim 7, wherein the port and starboard first inner boundary members meet and form a non-linear boundary element in front of the rear of the central wing element, extending from the front of the port inner tank across the port wing, across the central wing element and across the starboard wing to the front of the starboard inner tank.

9. An aircraft wing assembly as claimed in claim 7, wherein a shared dividing boundary member serves as the port and starboard dividing boundary members.

10. An aircraft wing assembly as claimed in claim 7, wherein the starboard dividing boundary member lies at the starboard edge of the central wing element.

11. An aircraft wing assembly as claimed in claim 1, wherein the port inner fuel tank includes a port second inner boundary member that lies in front of the rear of the central wing element and a port dividing boundary member extending between the rear of the central wing element and the port second inner boundary member.

12. An aircraft wing assembly as claimed in claim 11, wherein the starboard inner fuel tank includes a starboard second inner boundary member that lies in front of the rear of the central wing element and a starboard dividing boundary member extending between the rear of the central wing element and the starboard second inner boundary member.

13. An aircraft wing assembly as claimed in claim 12, wherein the port and starboard second inner boundary members meet and form a linear boundary element in front of the rear of the central wing element, extending from the front of the port inner tank across the port wing, across the central wing element and across the starboard wing to the front of the starboard inner tank.

14. An aircraft wing assembly as claimed in claim 12, wherein a shared dividing boundary member serves as the port and starboard dividing boundary members.

15. An aircraft wing assembly as claimed in claim 1, wherein the inner boundary member of at least one of the port inner fuel tank and the starboard inner fuel tank when viewed in plan extends, at least in part, in a direction at an angle of less than 10° to the direction of the rear boundary of the region of the wing in which the inner boundary member is located.

16. An aircraft wing assembly as claimed in claim 15, wherein the port inner fuel tank includes a port third inner boundary member that when viewed in plan extends in a direction at an angle of less than 2° to the direction of the rear boundary of the central wing element.

17. An aircraft wing assembly as claimed in claim 16, wherein the starboard inner fuel tank includes a starboard third inner boundary member that when viewed in plan extends in a direction at an angle of less than 2° to the direction of the rear boundary of the central wing element.

18. An aircraft wing assembly as claimed in claim 17, wherein the port and starboard third inner boundary members lie aligned with the rear of the central wing element, forming a linear boundary element extending from the front of the port inner tank across the port wing, across the central wing element and across the starboard wing to the front of the starboard inner tank.

19. An aircraft wing assembly as claimed in claim 1, wherein the port inner fuel tank includes a non-linear port fourth inner boundary member that includes a first part, in the central wing element, lying forward of the rear of the central wing element, a second part which joins the first part and lies about parallel to and ahead of the rear of the port wing, a third part which joins the second part and runs forward across the port wing to the front of the port wing, and a port dividing boundary member extending between the rear of the central wing element and the first part of the port fourth inner boundary member.

20. An aircraft wing assembly as claimed in claim 19, wherein the starboard inner fuel tank includes a non-linear starboard fourth inner boundary member that includes a first part, in the central wing element, lying forward of the rear of the central wing element, a second part which joins the first part and lies about parallel to and ahead of the rear of the starboard wing, a third part which joins the second part and runs forward across the starboard wing to the front of the starboard wing, and a starboard dividing boundary member extending between the rear of the central wing element and the first part of the starboard fourth inner boundary member.

21. An aircraft wing assembly as claimed in claim 20, wherein the port and starboard fourth inner boundary members meet and form a non-linear boundary element, extending from the front of the port inner tank across the port wing, along the port wing, across the central wing element, along the starboard wing and across the starboard wing to the front of the starboard inner tank.

22. An aircraft wing assembly as claimed in claim 20, wherein a shared dividing boundary member serves as the port and starboard dividing boundary members.

23. An aircraft wing assembly as claimed in claim 1, including port and starboard dry bays, which are when viewed in plan immediately behind the positions of the engines, wherein the port and starboard inner boundary members merge with the boundaries of the port and starboard dry bays.

24. An aircraft wing assembly as claimed in claim 1, wherein one or more central fuel tanks are provided within the central volume.

25. An aircraft wing assembly as claimed in claim 24, wherein the port and starboard inner boundary members serve as shared boundary members between the port and starboard inner tanks and the one or more central fuel tanks.

26. An aircraft wing assembly as claimed in claim 1, wherein the port and starboard wings of the aircraft wing assembly are swept wings and large enough to be suitable for use on an aircraft large enough to accommodate at least 100 passenger seats.

27. An aircraft wing assembly as claimed in claim 1, wherein the sum area defined by the footprint when viewed in plan of all of the fuel tanks in the wing assembly that cover a region outside of the at-risk zone and that do not extend into the at-risk zone is greater than 75% of the area defined by the footprint when viewed in plan of the volume in the wing assembly available for fuel tanks and outside of the at-risk zone.

28. An aircraft including an aircraft wing assembly as claimed in claim 1.

* * * * *